United States Patent [19]

Bassett

[11] Patent Number: 4,959,764

[45] Date of Patent: Sep. 25, 1990

[54] DC/DC CONVERTER SWITCHING AT ZERO VOLTAGE

[75] Inventor: John A. Bassett, Pleasanton, Calif.

[73] Assignee: Computer Products, Inc., Boca Raton, Fla.

[21] Appl. No.: 436,394

[22] Filed: Nov. 14, 1989

[51] Int. Cl.⁵ .......................................... H02M 3/335
[52] U.S. Cl. ...................................... 363/16; 363/20;
    323/222; 323/224; 323/282; 323/250
[58] Field of Search ...................... 363/20, 21, 97, 16;
    323/222, 224, 282, 290, 250, 330, 331

[56] References Cited

U.S. PATENT DOCUMENTS

| | | | |
|---|---|---|---|
| 4,415,959 | 11/1983 | Vinciarelli | 363/21 |
| 4,441,146 | 4/1984 | Vinciarelli | 363/20 |
| 4,672,303 | 6/1987 | Newton | 323/222 |
| 4,720,668 | 1/1988 | Lee et al. | 323/271 |
| 4,727,308 | 2/1988 | Huljak | 323/222 |
| 4,734,839 | 3/1983 | Barthold | 363/16 |
| 4,857,822 | 8/1989 | Tabisz et al. | 363/16 |

OTHER PUBLICATIONS

"A 14 MHz 100-Watt Class E Resonant Converter: Principles, Design Considerations and Measured Performance", R. Redl and N. Sokal, Power Electronics Conference, Oct. 7, 1986, pp. 1-10.

"Switching Supplies: Changing with the Times", J. Bassett, *Electronics*, Jan. 1988, pp. 145-150.

*Primary Examiner*—Peter S. Wong
*Attorney, Agent, or Firm*—Skjerven, Morrill, MacPherson, Franklin & Friel

[57] ABSTRACT

A two switch, DC/DC converter provides sufficient inductive energy storage at the termination of the "on" period of each switch to alter the charge on the intrinsic and stray capacitance of the combination of switches producing zero voltage across the alternate switch prior to its turn on. A short dead-band between the turn on pulses provided by the control circuit allows time for this transition. Thus the energy stored in the capacitance of the switches is returned to the source and load rather than being dissipated in the switching devices. This greatly improves the efficiency of the converter particularly when operating at high frequency. The unique topology of the converter provides other new and useful characteristics in addition to zero voltage switching capaibility such as operation at constant frequency with pulse-width-modulation for regulation, quasi-square wave output current, and the ability to integrate the magnetic elements with or without coupling.

10 Claims, 10 Drawing Sheets

DC/DC CONVERTER SWITCHING AT ZERO VOLTAGE

BACKGROUND OF THE INVENTION

1. FIELD OF THE INVENTION

This invention relates to DC/DC converters used in DC/DC and AC/DC power supplies, and more particularly to single ended, zero voltage switched DC/DC converters.

2. DESCRIPTION OF THE PRIOR ART

Single ended DC/DC converters are commonly classified as one of three classical topologies: the boost; the buck; and the buck-boost. These converters comprise various arrangements of a switch, a diode, an inductor and two capacitors. Dual circuits of these topologies also exist wherein two inductors and one capacitor appear.

Figure 1A:
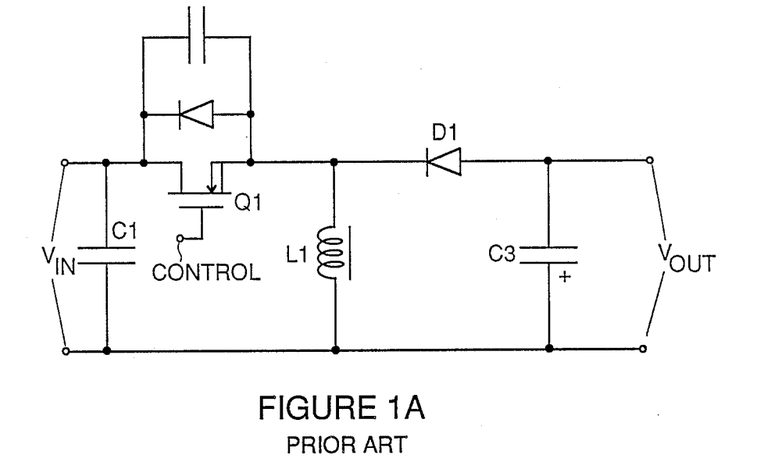
FIG. 1A (prior art) illustrates a dual circuit of the buck-boost converter.
Figure 1B:
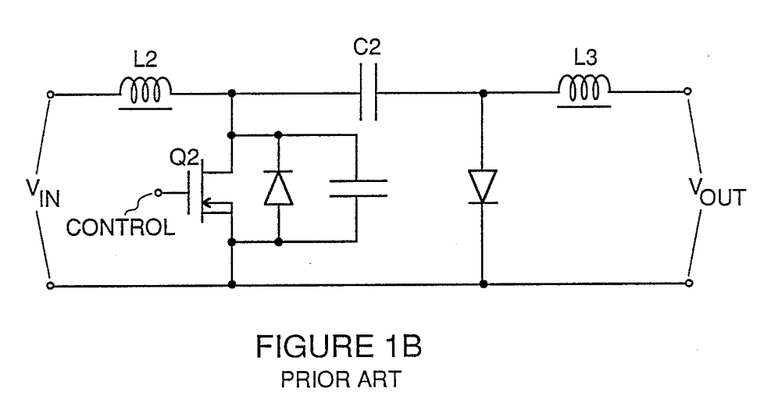
FIG. 1 (prior art) illustrates a non-isolated, single switch buck-boost converter.
Figure 2:
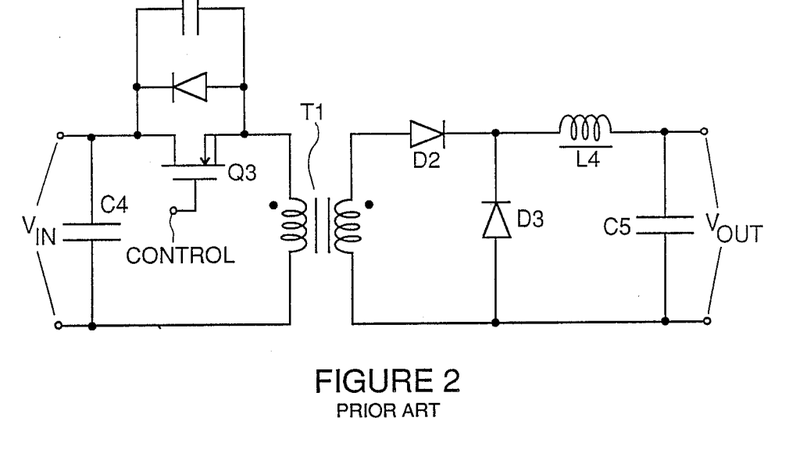
FIG. 2 (prior art) illustrates an isolated, single switch forward converter.
Figure 2A:
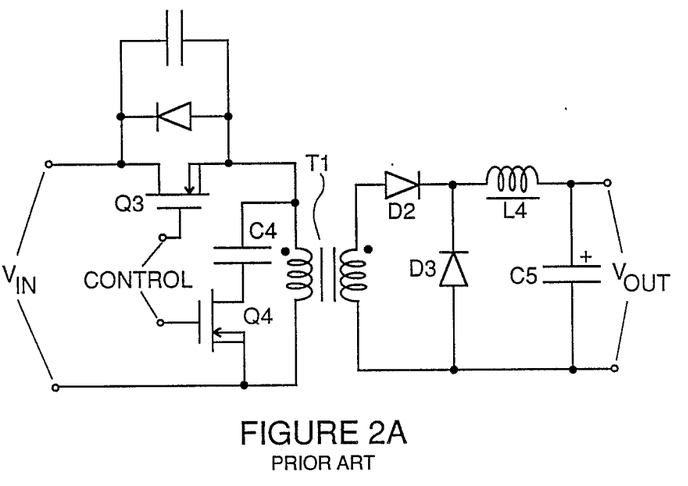
FIG. 2A (prior art) illustrates a forward converter with a second flux reset switch and capacitor.

FIGS. 1-2 illustrate examples of DC/DC converters. FIG. 1 illustrates a non-isolated, single switch buck-boost converter having a MOSFET power transistor Q1, inductor L1, diode D1, and capacitors C1 and C3. FIG. 1A illustrates the dual circuit of the buck-boost converter wherein shunt capacitors C1 and C3 are replaced by series inductors L2 and L3, shunt inductor L1 by series capacitor C2, and series switch Q1 by shunt switch Q2. FIG. 2 illustrates an isolated, single switch forward converter having transistor Q3, capacitors C4 and C5, diodes D2 and D3, inductor L4 and transformer T1. FIG. 2A illustrates a forward converter with a second flux reset switch Q4 and capacitor C4.

The performance of any circuit is related to the characteristics of the components used in the design, and many recent advances in technology have improved the characteristics of components. Unfortunately, the realization of ideal or lossless switching cannot be achieved with the simple circuits identified above, since in all cases, the switch is turned on while voltage is impressed across it. Any real device will exhibit capacitance between its terminals, and the energy stored in this capacitance ($\frac{1}{2}CV^2$) will be dissipated when the device turns on.

Figure 3:
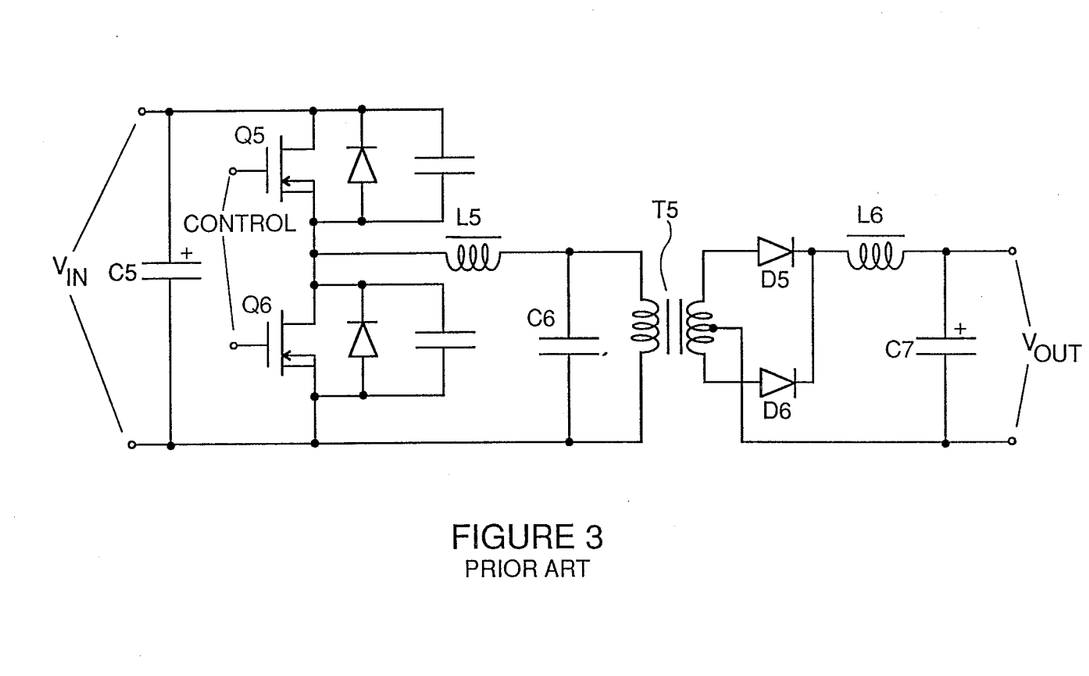
FIG. 3 (prior art) illustrates a full wave series resonant converter wherein control of the output requires changing the switching frequency.

Additional reactive elements have been added to the basic circuits, thus creating new classes of converters known as resonant converters. FIG. 3 illustrates a full wave series resonant converter wherein the output is controlled by varying the switching frequency. The resonant converter shown includes transistors Q5 and Q6, capacitors C5, C6, and C7, diodes D5 and D6, inductors L5 and L6, and transformer T5. When operated in an appropriate manner, resonant converters can exhibit either zero current or zero voltage switching, thereby significantly reducing the switching loss. In order to accomplish their task, the reactive components must handle considerable power, sometimes amounting to several times the output power of the converter. This energy, which circulates through the components, can induce new losses which are greater than the decrease in switching loss. In addition the operating voltage and/or RMS current stress on the semiconductor devices is often increased.

SUMMARY OF THE INVENTION

In accordance with the invention, a DC/DC converter allows zero-voltage switching while maintaining the beneficial features of the basic topologies and avoiding the disadvantages relating to resonant converter schemes. The invention may be embodied in a non-isolated form, an isolated form, an integrated magnetic form, and a coupled magnetic form. The non-isolated form comprises two switches, two diodes, two inductors, and at least one capacitor. The isolated form comprises two switches, two diodes, a transformer, an inductor, and at least one capacitor. The integrated magnetic form combines the transformer and the inductor of the isolated form on a common core with no mutual coupling. Finally, the coupled magnetic form introduces magnetic reluctance in the common flux paths of the integrated magnetic elements causing the output ripple current to be greatly reduced.

In each embodiment, energy stored in the magnetic elements is transferred to discharge the capacitance across each switch prior to closing the switch. Since the voltage across each switch is approximately zero as it is closed, switching loss is minimized. Hence, high converting efficiency may be realized.

The invention will be more readily understood by reference to the drawings and the detailed description. As will be appreciated by one skilled in the art, the invention is applicable to DC/DC converters, and is not limited to those disclosed in the preferred embodiments.

DETAILED DESCRIPTION OF THE INVENTION

Figure 4:
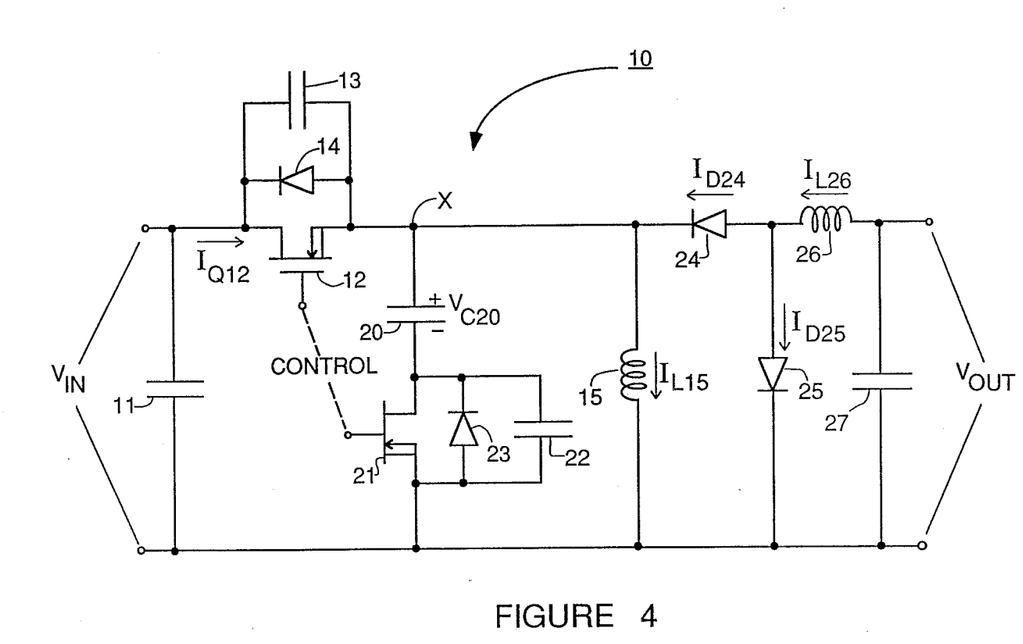
FIG. 4 illustrates a zero voltage switching converter in accordance with the invention.

A zero voltage switching converter 10 according to the invention is shown in FIG. 4. A capacitor 11 is connected across input terminals of converter 10 which receive a DC voltage. A transistor 12 switches input power to the remainder of converter 10 in response to a control signal. In this embodiment, transistor 12 is a power MOSFET characterized with an intrinsic capacitance 13 and an intrinsic body diode 14 shunted across the source and drain of transistor 12. Capacitance 13 also includes any discrete lumped capacitance or stay capacitance across transistor 12. In addition, diode 14 may be a discrete device rather than an intrinsic body diode of transistor 12. An inductor 15 is connected to the drain of transistor 12 and receives input power when transistor 12 is "on". A capacitor 20 and a transistor (FET) 21 are connected in series across inductor 15. An intrinsic capacitance 22 and a diode 23 are shunted across the source and drain of transistor 21. Diodes 24 and 25 are connected to inductor 15 and to a second inductor 26. Capacitor 27 is connected across the output terminals of converter 10.

The transfer function of converter 10 is easily derived since, in order to maintain flux balance under steady state conditions, the volt-second product impressed on inductor 15 during the on time of transistor 12 must equal the volt-second product during the off time, or:

$$V_{in} \times t_{on} = V_{C20} \times t_{off} \quad (1)$$

For the purpose of explanation, capacitor 20 is considered to be large such that $V_{C20}$ is constant over an operating cycle in spite of charge and discharge current. The output voltage is the time ratioed average of the voltage across capacitor 20 ($V_{C20}$) during the off time of transistor 12 while diode 24 is conducting. Thus, the output voltage is given by:

$$V_{out} = V_{C20} \times t_{off}/(t_{on} + t_{off}) \quad (2)$$

When equations (1) and (2) are combined to eliminate $V_{C20}$, the result is:

$$V_{out} = V_{in} \times t_{on}/(t_{on} + t_{off}) \quad (3)$$

This voltage transfer function is the same as that of the forward converter of FIG. 2.

Although capacitor 20 has been considered large to simplify the above description, it should be noted that capacitor 20 in accordance with the invention may be relatively small such that $V_{C20}$ is not constant over an operating cycle.

Figure 4A:
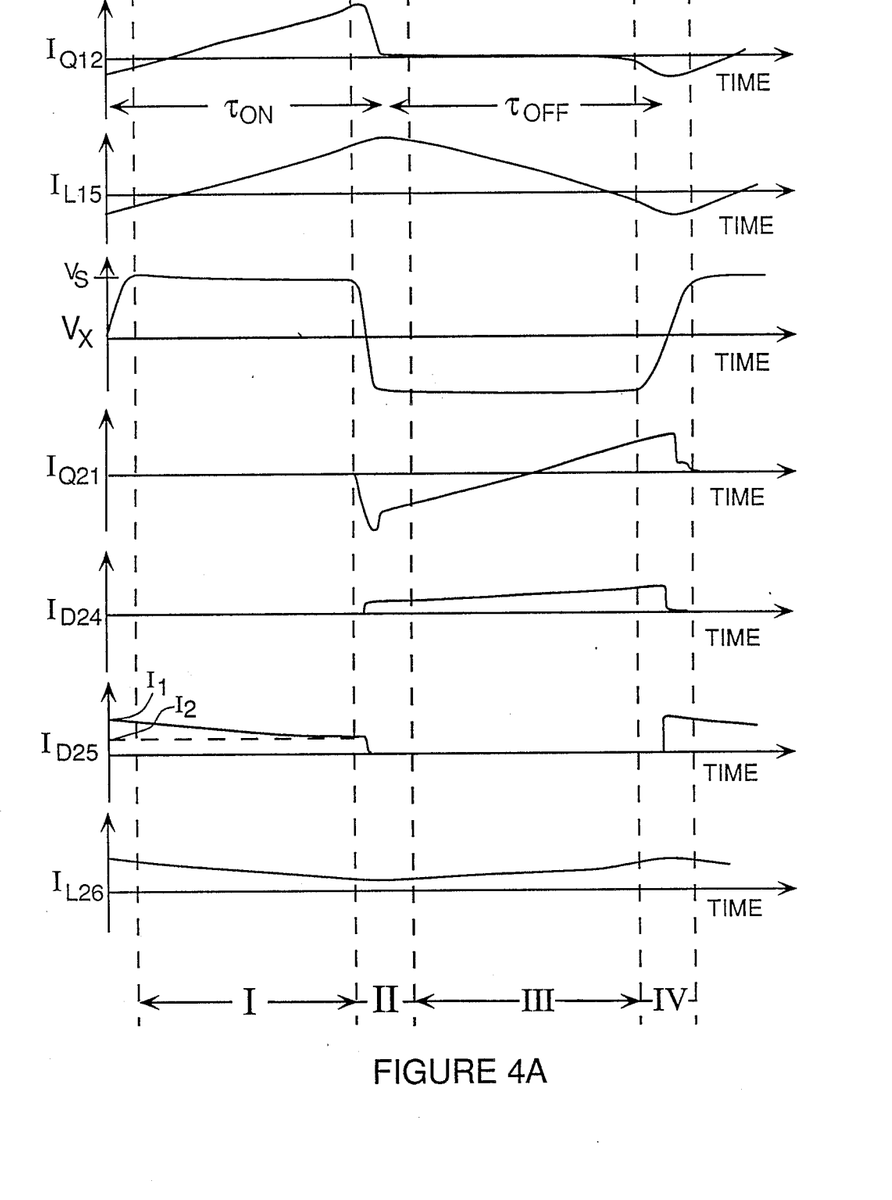
FIG. 4A illustrates current and voltage waveforms in accordance with the operation of the invention.

A detailed description of the invention is best understood by analyzing the circuit operation in each of four periods. Referring to FIG. 4 and the waveforms of FIG. 4A, the operation is as follows: transistor 12 is first turned on by the control and input voltage is applied to the winding of inductor 15. Current increases linearly in inductor 15 according to the relation $I = (V_{in}/L_{15}) t_1$, where $t_1$ represents the on time of transistor 12 and $L_{15}$ is the inductance of inductor 15. Diode 24 is reverse biased during this time and energy is not transferred from input to output. This period is the first phase of operation shown as time period I in FIG. 4A.

At a time determined by the control circuit, transistor 12 is turned off. The stored magnetic energy in inductor 15 maintains the flow of current in the same direction, charging capacitance 13 which shunts transistor 12. A portion of the current also flows through capacitor 20 and discharges capacitance 22 which shunts transistor 21. When the voltage ($V_x$) at node X reaches zero, diode 24 becomes forward biased, and consequently a further portion of the current of inductor 15 begins to flow to the output through diode 24. Current does not flow through diode 25 since it is reverse biased. The remaining current in inductor 15 continues charging capacitance 13 and capacitance 22 until the voltage at node X equals the voltage across capacitor 20, at which time diode 23 begins to conduct. It should be noted that the voltage across transistor 21 is approximately zero when diode 23 begins to conduct and charge does not accumulate across capacitance 22. The excess current in inductor 15 continues to transfer to charge capacitor 20. During this period (Period II), transistor 21 is turned on by the control circuit. Thus, since the voltage across transistor 21 is approximately zero when turned on, minimal switching loss occurs. This completes the second phase of operation shown as period II in FIG. 4A.

At the mid point of period III, when the current flowing in inductor 15 equals the current flowing in inductor 26, capacitor 20 begins discharging through transistor 21 into the load. The current in inductor 26 increases according to the relation $I_{L26} = (V_{C20} - V_{out})/L_2 \times t_2$, where $t_2$ represents the on time of transistor 21. Eventually the magnetization of inductor 15 is reversed and the current in its winding reverses (see FIG. 4A). At the end of the period set by the fixed frequency of operation, transistor 21 is turned off by the control circuit. This completes the third phase of operation shown as period III in FIG. 4A.

Currents from inductor 15 and inductor 26 combine at node X, discharging capacitor 13 and charging capacitor 22 until the voltage at node X equals zero. The current in inductor 26 is then shunted through diode 25 since diode 24 is reverse biased. The remaining current in inductor 15 continues to discharge capacitor 13 until diode 14 conducts. At this time, any remaining energy in inductor 15 is returned to the input. The voltage across transistor 12 is approximately zero since charge does not accumulate across capacitance 13. This completes phase four, shown as period IV in FIG. 5. The control circuit again turns on transistor 12 to begin phase one of operation. It should be noted that since only a small voltage is impressed across transistor 12 when it is turned on, minimal switching loss occurs.

The two switch, DC/DC converter 10 thus provides sufficient inductive energy storage at the termination of the "on" period of each switch to alter the charge on the intrinsic and stray capacitance of the combination of switches producing zero voltage across the alternate switch prior to its turn on. The short dead-band between the turn on pulses provided by the control circuit allows time for this transition. Thus the energy stored in the capacitance of the switches is returned to the source and load rather than being dissipated in the switching devices. This greatly improves the efficiency of the converter, particularly when operating at high frequency. The topology of converter 10 provides other characteristics in addition to zero voltage switching such as operability at a constant frequency with pulse-width-modulation for regulation and quasi-square wave output current.

Figure 5:
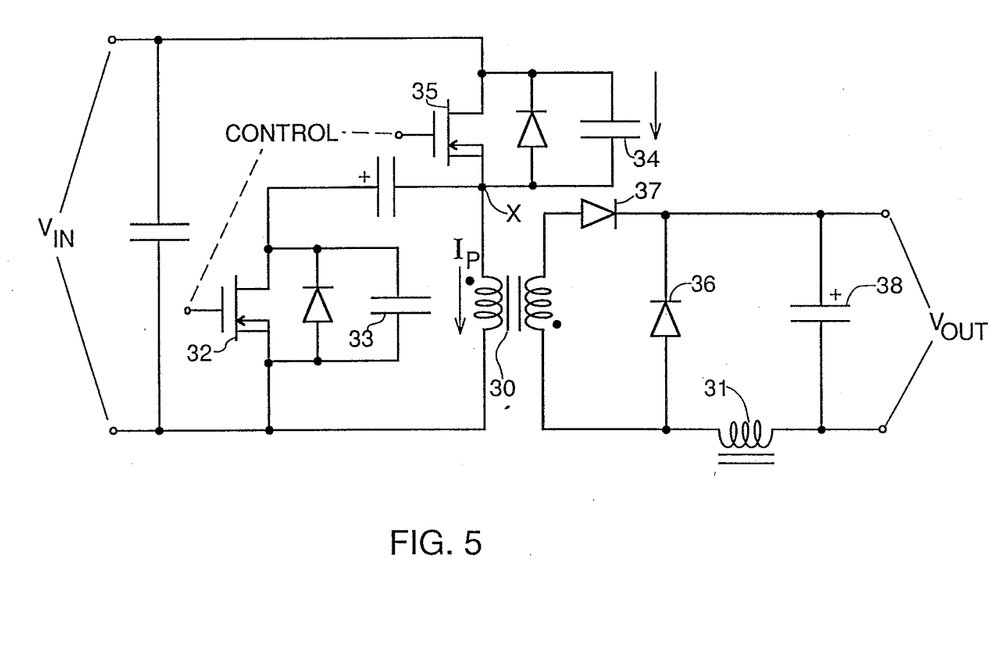
FIG. 5 illustrates an isolated embodiment of the invention with accompanying waveforms in FIG. 5A showing variations from FIG. 4A.
Figure 5A:
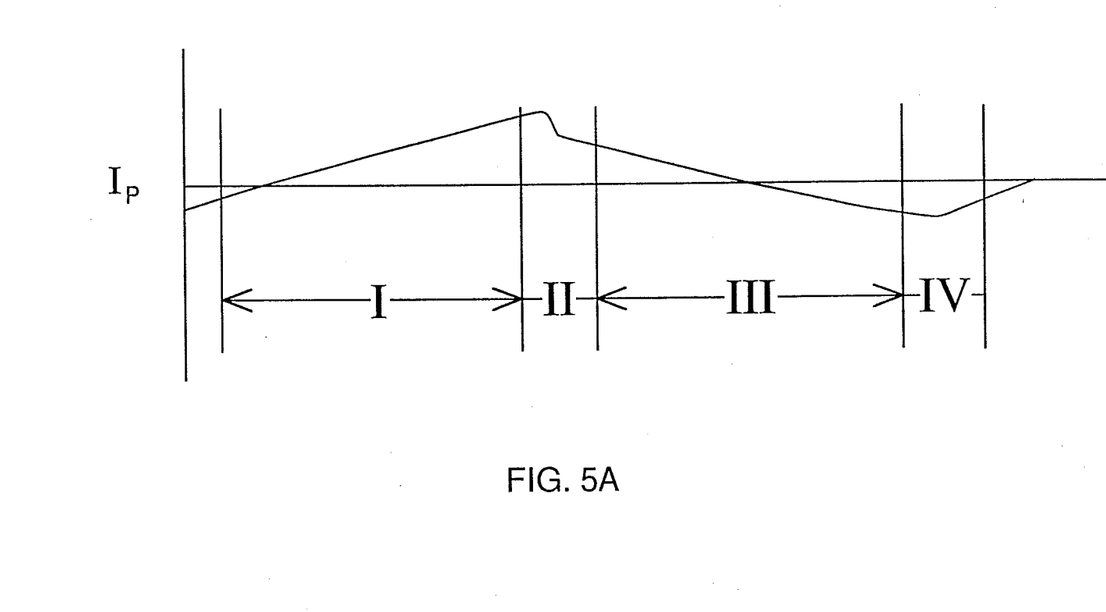

A second embodiment of the invention, shown in FIG. 5, is constructed by replacing inductor 15 with transformer 30. The circuit of FIG. 5 is an isolated DC/DC converter in accordance with the invention. A gap in the magnetic path of transformer 30 sets the primary winding reactance equal to inductor 15 of FIG. 4.

Using conventional schematic notation, transformer 30 has a dot at one terminal of the primary coil and a dot at one terminal of the secondary coil. In accordance, a current entering the dotted terminal of one coil produces an open circuit voltage between the terminals of the second coil which is sensed in the direction indicated by a positive voltage reference at the dotted terminal of this second coil.

In operation, the isolated converter is similar to that of the non-isolated converter described above. During period III of operation, the magnetizing current shifts from the primary winding to the secondary winding in accordance with the rule of conservation of ampere turns; i.e., $N_p \times I_{P0} + N_S \times I_{S0} = N_p \times I_{P1} + N_S \times I_{S1}$ where $I_{S0}$ and $I_{S1}$ equal the current in the secondary of transformer 30 and inductor 31 at times zero and one respectively and $I_{P0}$ and $I_{P1}$ equal the current in the primary of transformer 30 and transistor 32 at times zero and one respectively. The waveform of FIG. 5 illustrates the current flowing through the primary of transformer 30.

The isolated embodiment of FIG. 5 allows zero voltage switching in a manner similar to the non-isolated circuit of FIG. 4. Intrinsic capacitance 33 shunting transistor 32 is discharged by energy stored in the primary of transformer 30. Diode 34 prevents charge build-up in capacitance 33 before transistor 32 turns on.

Similarly, intrinsic capacitance 34 shunting transistor 35 is discharged by energy stored in the primary of transformer 30 and in inductor 31 before the control turns on transistor 35. Hence, zero voltage switching is achieved and switching loss is minimized.

In addition to the benefit of zero voltage switching, the converter of FIG. 5 has other advantages. Dielectric isolation between input and output is achieved. The output voltage may be changed with respect to the input voltage in accordance with the transformer turns ratio $N_S/N_P$. The input current may also be changed with respect to the output current in accordance with the turns ratio. Furthermore, incorporation of the transformer leakage reactance into the inductance of the primary of transformer 30 and into inductor 31 avoids the typical energy loss due to leakage reactance. Incorporation of the transformer winding capacitance into the intrinsic and distributed capacitance at node X avoids loss due to winding capacitance since energy charging the capacitance positively transfers to charge the capacitance negatively rather than dissipating.

Figure 6:
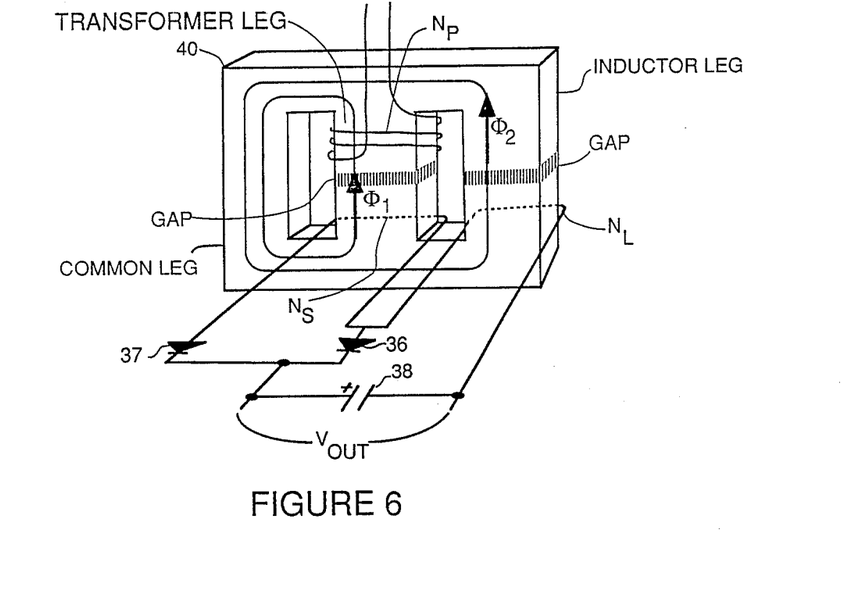
FIG. 6 illustrates a transformer combined with an inductor and in FIG. 6A its magnetic circuit to form an integrated magnetic embodiment of the isolated converter.
Figure 6A:
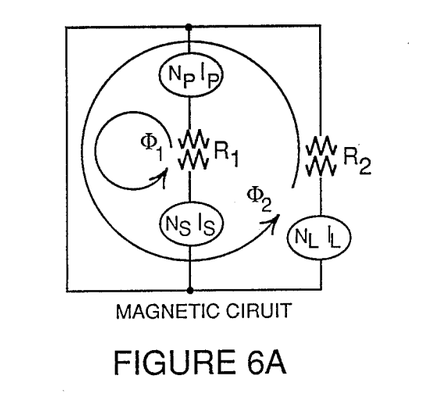

A third embodiment of the invention is constructed by combining transformer 30 and inductor 31 of FIG. 5 on a common magnetic core 40 as shown in FIG. 6. The polarity of voltages, currents, and windings is such that the DC components of magnetic flux from the transformer leg and the inductor leg add to the third leg of the core, while the AC components of magnetic flux from the transformer leg and inductor leg subtract in the third leg. In addition to the advantages listed with respect to the second embodiment of the invention, several other advantages of this embodiment are achieved. Due to the sharing of core material, the volume of the core is reduced and therefore the total core losses are proportionally reduced. In addition, since losses in magnetic cores are due only to the AC flux, the subtraction of flux in the third leg further reduces the loss in this portion of the core. Finally, the multiplicity of components is reduced.

Figure 7:
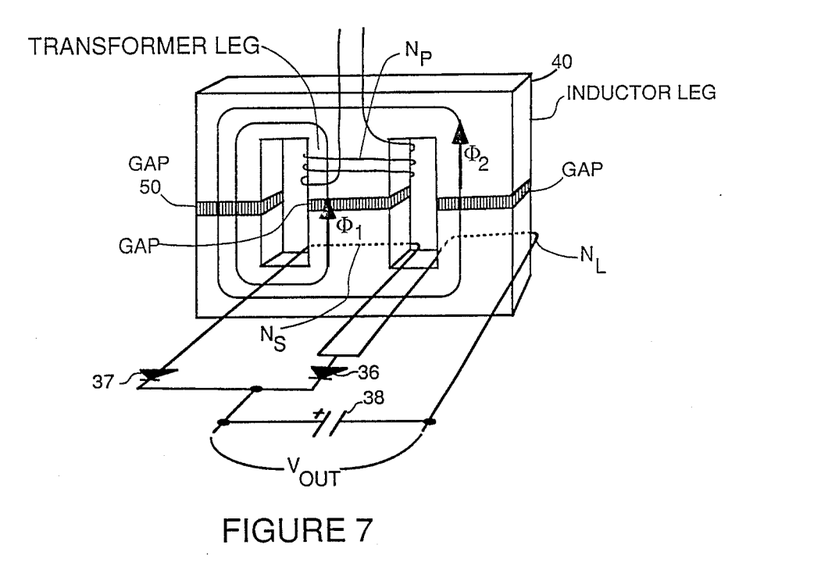
FIG. 7 illustrates a transformer combined with an inductor and in FIG. 7A its magnetic circuit to form a coupled magnetic embodiment of the isolated converter wherein output ripple current is reduced by added magnetic coupling as shown by the waveforms in FIG. 7B.
Figure 7A:
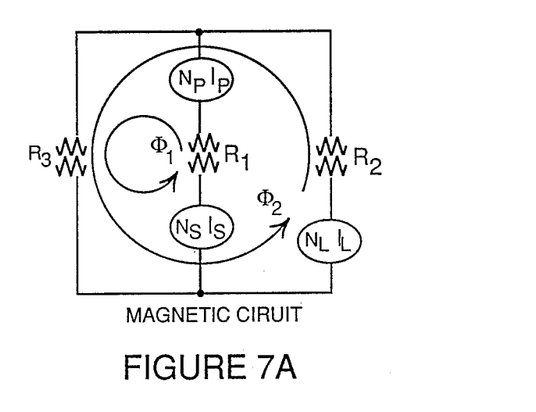
Figure 7B:
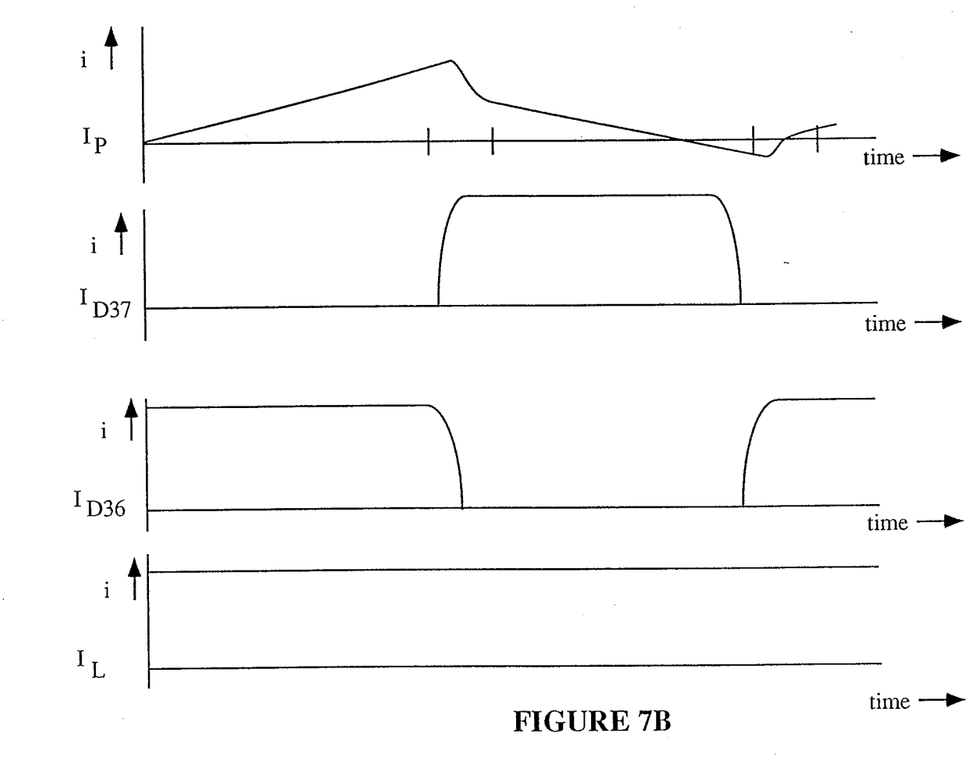

A fourth embodiment of the invention is constructed by inserting a magnetic reluctance (gap) 50 in the third leg of composite core 40, as shown in the integrated transformer of FIG. 7. The effect is such that during the conduction time of transistor 35 (interval I) energy is transferred from the primary of the transformer to the inductor leg, and the rate of decrease of current in the inductor and therefore diode 36 and the output circuits is abated and can be zero. Similarly, during the conduction of transistor 32 (interval III), energy is transferred uniformly over the interval and the current in the inductor and therefore diode 37, the transformer secondary and the output circuits exhibits less change and can be constant. The benefits are decreased ripple current in the output, reduced stress on the output filter capacitor 38 and improved smoothing of the output voltage. The current in the diodes and the load is demonstrated by the wave-shapes accompanying FIG. 7 and can be compared with the similar wave-shapes of FIG. 4A. The effect is defined mathematically for the interval I by the following equations, and can be similarly demonstrated for interval III by those skilled in the art.

Referring to FIG. 7, loop equations can be written relating to the magnetic circuit:

$$N_p I_p + N_s I_s = \Phi_1 R_1 + (\Phi_1 \Phi_2) R_3 \quad (1)$$

$$N_L I_L = \Phi_2 R_2 + (\Phi_1 + \Phi_2) R_3 \quad (2)$$

Differentiating equation (2) with respect to time yields:

$$N_L dI_L/dt = R_3 d\Phi_1/dt + (R_2 + R_3) d\Phi_2/dt \quad (3)$$

For zero ripple, set $dI_L/dt = 0$;
During period I, $$V_{in} = -E_p = N_p d\Phi_1/dt; \text{ and } V_{out} = -N_L d\Phi_2/dt.$$

Therefore, $$(V_{in}/N_p) R_3 = (V_{out}/N_L)(R_2 + R_3) \quad (4)$$

Thus, when a transformer is used, the transfer function becomes:

$$V_{out} = V_{in}(N_s/N_p)((T_{on} + t_{off})) \quad (5)$$

Substituting (5) into (4) and letting $t_{on}/(t_{on} + t_{off}) = \delta$ the duty cycle, and $N_L = N_s$ for simplicity yields:

$$R_3/(R_2 + R_3) = \delta \quad (6)$$

Consequently, when the reluctance ratio is equal to the duty cycle ratio, the ripple current in the output circuit vanishes. The air gaps can be chosen for this to occur at midpoint conditions, minimizing the ripple over the operating range.

The embodiments described above are intended to be exemplary and not limiting. In view of the above disclosure, modifications will be obvious to one of ordinary skill in the art without departing from the scope of the invention.

I claim:

1. A single ended, zero voltage switching converter circuit comprising:
   a first inductive element having a first terminal and a second terminal;
   a first switching means for selectively coupling power from a power supply to said first inductive element, said first switching means including an intrinsic capacitance;
   a first capacitive element having a first plate and a second plate, the first plate connected to the first terminal of said first inductive element;
   a second switching means connected to the second plate of said first capacitive element and in series with said first capacitive element across said first inductive element, said second switching means including an intrinsic capacitance;

a first diode having a first terminal and a second terminal, the first terminal of said first diode connected to the first terminal of said first inductive element;

a second diode having a first terminal and a second terminal, the first terminal of said second diode connected to the second terminal of said first inductive element, and the second terminal of said second diode connected to the second terminal of said first diode;

a second inductive element having a first terminal and a second terminal, the first terminal connected to the second terminals of said first and second diodes, and the second terminal connected to an output of said converter circuit;

a third diode in parallel with said first switching means; and a fourth diode in parallel with said second switching means;

wherein energy stored in said first inductive element discharges the intrinsic capacitance of said first switching means prior to turning on said first switching means, and wherein energy stored in said first inductive element discharges the intrinsic capacitance of said second switching means prior to turning on said second switching means.

2. The converter circuit as recited in claim 1 wherein said first switching means is a MOSFET power transistor and said second switching means is a MOSFET power transistor and said third and fourth diodes are body diodes.

3. The converter circuit as recited in claim 1 wherein said first diode conducts during a period when said first switching means is open.

4. A single ended, zero voltage switching converter circuit comprising:

a transformer having a primary winding and a secondary winding;

a first switching means for selectively coupling power from a power supply to the primary winding of said transformer, said first switching means including an intrinsic capacitance;

a first capacitive element having a first and a second plate, the first plate connected to the primary winding of said transformer;

a second switching means connected to the second plate of said first capacitive element and in series with said first capacitive element across the primary winding of said transformer, said second switching means including an intrinsic capacitance;

a first diode having a first terminal and a second terminal, the first terminal connected to a first terminal of the secondary winding of said transformer;

a second diode having a first terminal and a second terminal, the first terminal connected to a second terminal of the secondary winding of said transformer and the second terminal of said second diode connected to the second terminal of said first diode;

an inductor having a first and a second terminal, said first terminal connected to the first terminal of said second diode;

a second capacitive element having a first and a second plate, the first plate connected to the second terminals of said first and second diodes and the second plate connected to the second terminal of said inductor;

a third diode in parallel across said first switching means; and a fourth diode in parallel across said second switching means;

wherein energy stored in the primary winding of said transformer discharges the intrinsic capacitance of said first switching means prior to turning oh said first switching means, and wherein energy stored in in the primary of said transformer discharges the intrinsic capacitance of said second switching means prior to turning on said second switching means.

5. The converter circuit as recited in claim 4 wherein said transformer and said inductor are integrated on a common magnetic core.

6. The converter circuit as recited in claim 5 wherein a magnetic reluctance is in a third leg of said common magnetic core.

7. The converter circuit as recited in claim 5 wherein said common magnetic core has three legs, each of said legs including a magnetic gap.

8. The converter circuit as recited in claim 4 wherein said first switching means is a MOSFET power transistor and said second switching means is a MOSFET power transistor and said third and fourth diodes are body diodes.

9. The converter circuit as recited in claim 4 wherein said first diode conducts during a period when said first switching means is open.

10. The converter circuit as recited in claim 4 wherein a dotted terminal of the primary winding of said transformer is connected to said first switching means and wherein a non-dotted terminal of the secondary of said transformer is connected to said first diode.

* * * * *